United States Patent
Bui et al.

(10) Patent No.: US 6,658,594 B1
(45) Date of Patent: Dec. 2, 2003

(54) ATTENTION MECHANISM FOR IMMEDIATELY DISPLAYING/LOGGING SYSTEM CHECKPOINTS

(75) Inventors: Tam D. Bui, Austin, TX (US); Van Hoa Lee, Cedar Park, TX (US); Kiet Anh Tran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 09/616,142

(22) Filed: Jul. 13, 2000

(51) Int. Cl.[7] .............................................. G06F 11/00
(52) U.S. Cl. ............... 714/10; 714/9; 714/57; 712/16
(58) Field of Search .................. 714/23, 13, 25, 714/44, 57, 10, 9, 35; 712/16; 710/267

(56) References Cited

U.S. PATENT DOCUMENTS

| | | | | |
|---|---|---|---|---|
| 4,455,601 A | * | 6/1984 | Griscom et al. ............... 714/13 |
| 5,560,019 A | * | 9/1996 | Narad .......................... 710/260 |
| 5,875,343 A | * | 2/1999 | Binford et al. ............. 710/263 |
| 5,884,021 A | * | 3/1999 | Hirayama et al. ............. 714/13 |
| 6,189,117 B1 | * | 2/2001 | Batchelor et al. ............. 714/48 |
| 6,574,748 B1 | * | 6/2003 | Andress et al. ............... 714/11 |

* cited by examiner

Primary Examiner—Robert Beausoliel
Assistant Examiner—Christopher S. McCarthy
(74) Attorney, Agent, or Firm—Duke W. Yee; Mark E. McBurney; Stephen R. Loe (57) ABSTRACT

A method, system, and apparatus of recording information generated by a data processing system prior to completion enablement of programmed input/output services for the data processing system is provided. In one embodiment, a service processor receives an attention interrupt from a host processor. The service processor then stops the operation of all host processors in the data processing system. The service processor then reads the information, such as a system checkpoint, from a buffer within the host processor's system memory and writes the information into a non-volatile random access memory as well as displays the information to a user via a video display. The service processor then restarts the host processors.

39 Claims, 6 Drawing Sheets

FIG. 1

```
.globl .attn_checkpoint    502
.globl checkpoint_buff     504
.attn_checkpoint:
                514   attn 1              # this is the attention instruction
                516   .long 124           # offset of the blr instruction from the
    506                                     attn instruction
                510   .space 116          # checkpoint_length (4 bytes) and
                                            information (112 bytes)
checkpoint_buff:
                512   blr                 # return to caller
    508
```

FIG. 5

500
ASSEMBLY LANGUAGE ROUTINE

300 DATA PROCESSING SYSTEM

FIG. 4

400
LOGICALLY PARTITIONED PLATFORM

C-FUNCTION CALL
600

```
extern unsigned char checkpoint_buff[120];  /—602
extern void attn_checkpoint ( void );  /—604
extern void movebytes ( char *src, char *dst, unsigned int len );  /—606 struct {  /—608
    unsigned int len;  /—610
    unsigned char info[112];  /—612
} chk_buf;  —614

/* the example is for 4-byte firmware checkpoin */
chk_buf.len = 4;  —616
chk_buf.info[0] = 'E' ;  —618
chk_buf.info[1] = '1' ;  —620
chk_buf.info[2] = '2' ;  —622
chk_buf.info[3] = '3' ;  —624
movebytes( &chk_buf.len, checkpoint_buff., 8);  /—626
attn_checkpoint();  /* display E123 to op-panel and log it into NVRAM*/  —628
```

FIG. 6

ATTENTION MECHANISM FOR IMMEDIATELY DISPLAYING/LOGGING SYSTEM CHECKPOINTS

BACKGROUND OF THE INVENTION

1. Technical Field

The present invention relates generally to the field of computer architecture and, more specifically, to methods and systems for displaying and logging system checkpoints.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

Many data processing systems utilize a method of recovering from a system failure referred to as a checkpoint/restart. A checkpoint is a copy of the computer's memory that is periodically saved on disk along with the current register settings (last instruction executed, etc.). In the event of any failure, the last checkpoint serves as a recovery point. When the problem has been fixed, the restart program copies the last checkpoint into memory, resets all the hardware registers and starts the computer from that point. Any transactions in memory after the last checkpoint was taken until the failure occurred will be lost. Typically, the checkpoint information is logged to a non-volatile random access memory (NV-RAM) as well as displayed to a user on an operator panel.

The set of codes to perform the initialization of the I/O path is fairly complex and error-prone in early development which are not fully debugged. Therefore, it is desirable to have the visual checkpoint mechanism for an progress indicator to help debugging any software errors when a system crash occurs during the I/O subsystem initialization. By the same token, in cases of possible errors of hardware components while accessing and setting up their registers, the checkpoint/progress code helps to pin-point which register of what hardware chip was being accessed right before the crash, thus facilitating the setup of equipment to capture the failure for analysis. Although, there is no requirement that the system be completely booted in order to display/log checkpoints, the current checkpoint mechanism requires its I/O path be fully configured. Thus no progress indicator is available during the execution of the complex I/O initialization code. Therefore, it would be desirable to have a method of displaying and logging system checkpoints to the operator panel and NV-RAM prior to the data processing system completing the booting process.

SUMMARY OF THE INVENTION

The present invention provides a method, system, and apparatus of recording information generated by a data processing system prior to completion enablement of programmed input/output services for the data processing system. In one embodiment, a service processor receives an attention interrupt from a host processor. The service processor then stops the operation of all host processors in the data processing system. The service processor then reads the information, such as a system checkpoint, from a buffer within the host processor's system memory and writes the information into a non-volatile random access memory as well as displays the information to a user via a video display. The service processor then restarts the host processors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
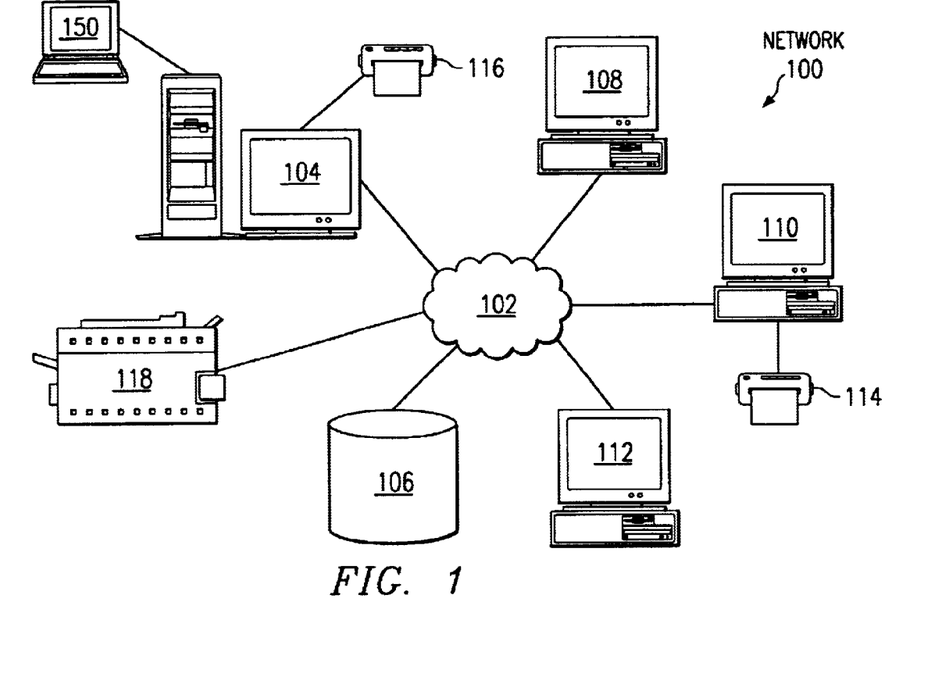
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. of course, distributed data processing system 100 also may be implemented as a number of different types of networks such as, for example, an intranet or a local area network.

FIG. 1 is intended as an example and not as an architectural limitation for the processes of the present invention.

Figure 2:
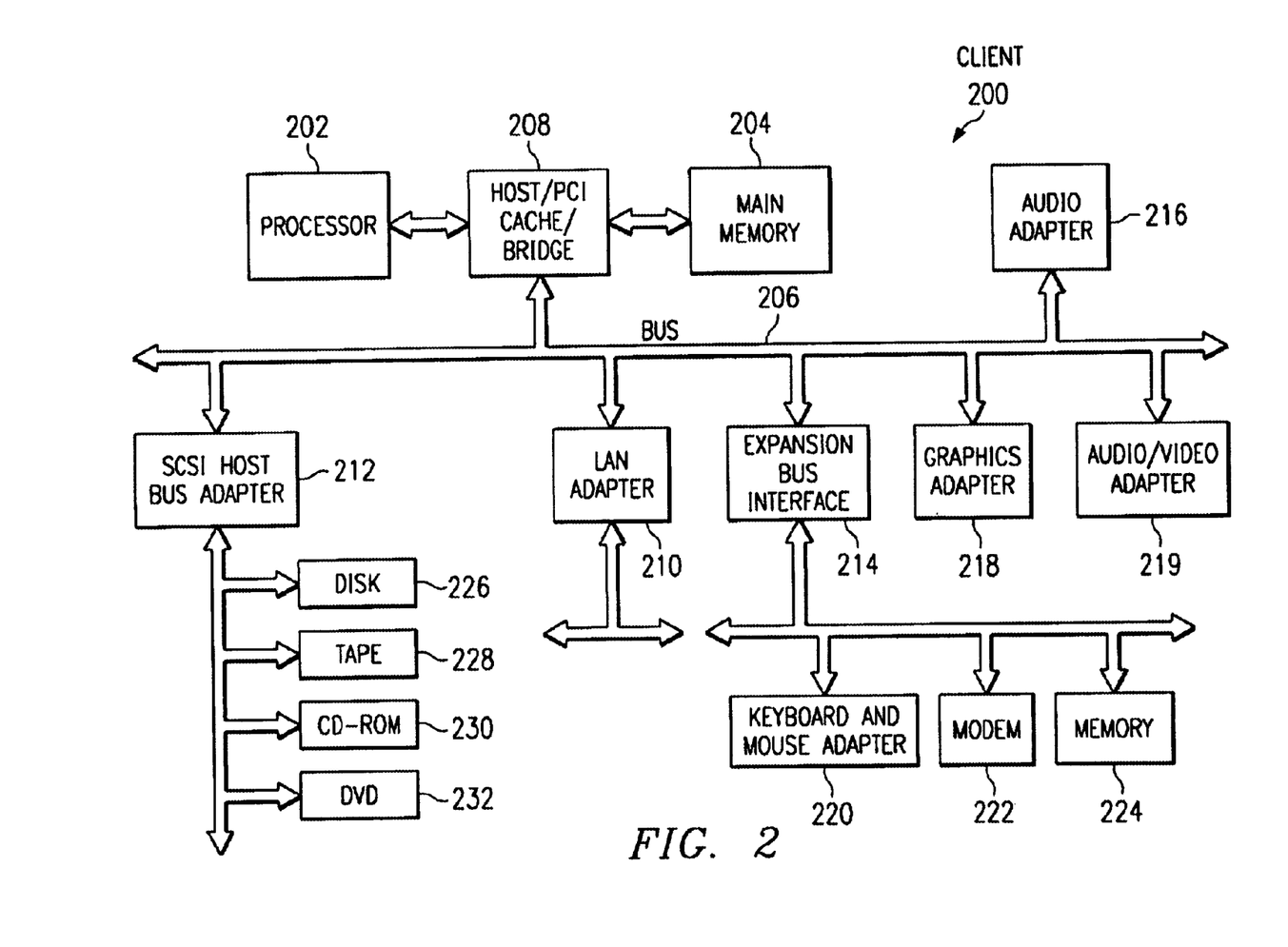
FIG. 2 depicts a block diagram of a data processing system in accordance with the present invention.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
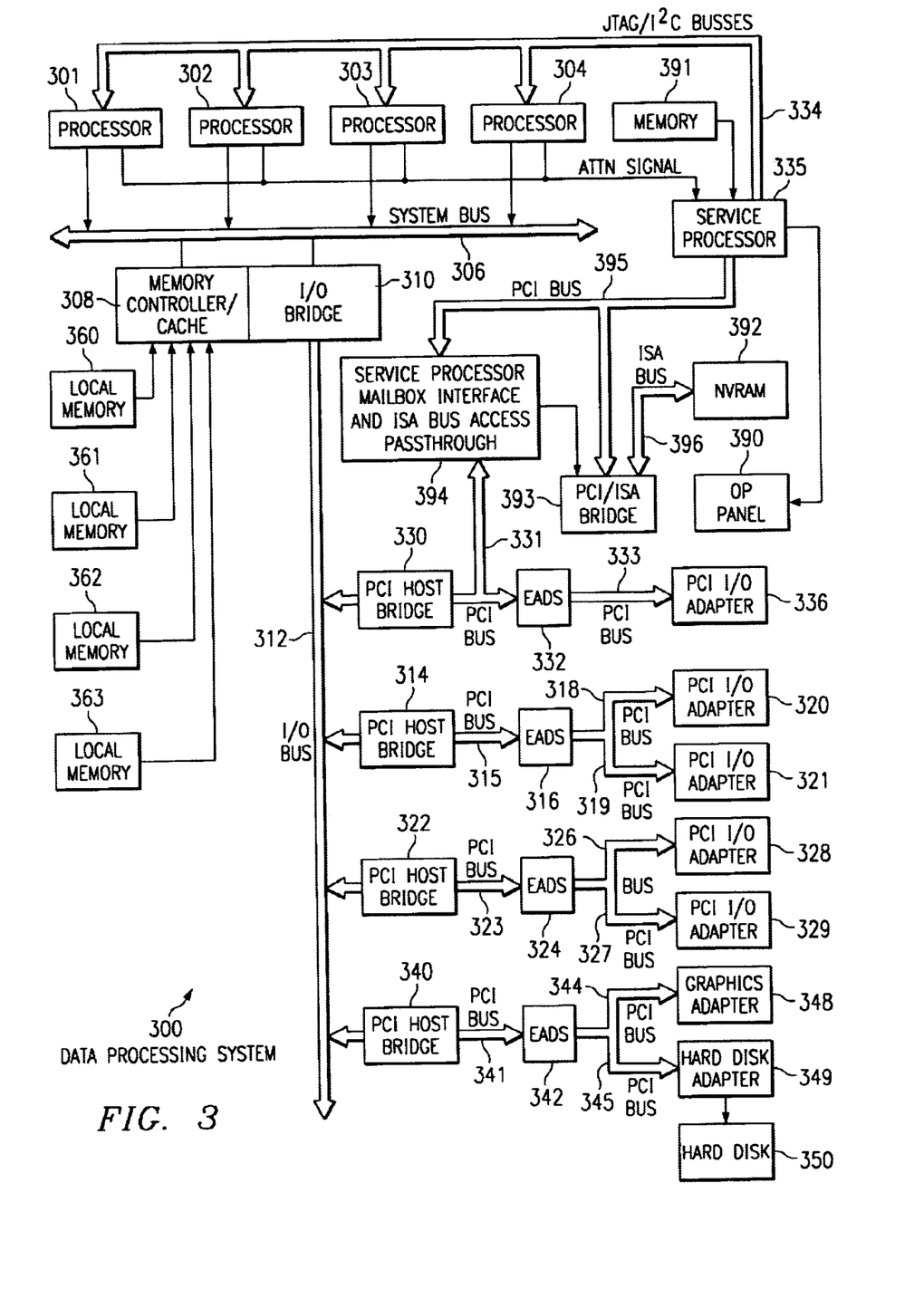
FIG. 3 depicts a block diagram of a data processing system in which the present invention may be implemented.

With reference now to FIG. 3, a block diagram of a data processing system, which may be implemented as a logically partitioned server, such as server 104 in FIG. 1, and in which the present invention may be implemented is depicted. Data processing system 300 may be a symmetric multiprocessor (SMP) system including a plurality of processors 301, 302, 303, and 304 connected to system bus 306. For example, data processing system 300 may be an IBM RS/6000, a product of International Business Machines Corporation in Armonk, N.Y., implemented as a server within a network. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336, and 348–349 may be assigned to different logical partitions.

Thus, for example, suppose data processing system 300 is divided into three logical partitions, P1, P2, and P3. Each of I/O adapters 320–321, 328–329, 336 and 348–349, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 336 may be assigned to partition P2; and processor 304, memories 362–363, and I/O adapters 348–349 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 314 connected to I/O bus 312 provides an interface to PCI local bus 315. A number of Input/Output adapters 320–321 may be connected to PCI bus 315. Typical PCI bus implementations will support between four and eight I/O adapters (i.e. expansion slots for add-in connectors). Each I/O Adapter 320–321 provides an interface between data processing system 300 and input/output devices such as, for example, other network computers, which are clients to data processing system 300.

An additional PCI host bridge 322 provide an interface for an additional PCI bus 323. PCI bus 323 is connected to a plurality of PCI I/O adapters 328–329 by a PCI bus 326–327. Thus, additional I/O devices, such as, for example, modems or network adapters may be supported through each of PCI I/O adapters 328–329. In this manner, data processing system 300 allows connections to multiple network computers.

A memory mapped graphics adapter 348 may be connected to I/O bus 312 through PCI Host Bridge 340 and EADS 342 via PCI buses 341 and 344 as depicted. Also, a hard disk 350 may also be connected to I/O bus 312 through PCI Host Bridge 340 and EADS 342 via PCI buses 341 and 345 as depicted. Hard disk 350 may be logically partitioned between various partitions without the need for additional hard disks. However, additional hard disks may be utilized if desired.

A PCI host bridge 330 provides an interface for a PCI bus 331 to connect to I/O bus 312. PCI bus 331 connects PCI host bridge 330 to the service processor mailbox interface and ISA bus access passthrough logic 394 and EADS 332. The ISA bus access passthrough logic 394 forwards PCI accesses destined to the PCI/ISA bridge 393. The NV-RAM storage is connected to the ISA bus 396. The Service processor 335 is coupled to the service processor mailbox interface 394 through its local PCI bus 395. Service processors 335 is also connected to processors 301–304 via a plurality of JTAG/I$^2$C buses 334. JTAG/I$^2$C buses 334 are a combination of JTAG/scan busses (see IEEE 1149.1) and Phillips I$^2$C busses. However, alternatively, JTAG/I$^2$C buses 334 may be replaced by only Phillips I$^2$C busses or only JTAG/scan busses. All SP-ATTN signals of the host processors 301, 302, 303, and 304 are connected together to an interrupt input signal of the service processor. The service processor 335 has its own local memory 391, and has access to the hardware op-panel 390.

When data processing system 300 is initially powered up, service processor 335 uses the JTAG/scan buses 334 to interrogate the system (Host) processors 301–304, memory controller 308, and I/O bridge 310. At completion of this step, service processor 335 has an inventory and topology understanding of data processing system 300. Service processor 335 also executes Built-In-Self-Tests (BISTs), Basic Assurance Tests (BATs), and memory tests on all elements found by interrogating the system processors 301–304, memory controller 308, and I/O bridge 310. Any error information for failures detected during the BISTs, BATs, and memory tests are gathered and reported by service processor 335.

If a meaningful/valid configuration of system resources is still possible after taking out the elements found to be faulty during the BISTS, BATs, and memory tests, then data processing system 300 is allowed to proceed to load executable code into local (Host) memories 360–363. Service processor 335 then releases the Host processors 301–304 for execution of the code loaded into Host memory 360–363. While the Host processors 301–304 are executing code from respective operating systems within the data processing system 300, service processor 335 enters a mode of monitoring and reporting errors. The type of items monitored by service processor include, for example, the cooling fan speed and operation, thermal sensors, power supply regulators, and recoverable and non-recoverable errors reported by processors 301–304, memories 360–363, and bus-bridge controller 310.

Service processor 335 is responsible for saving and reporting error information related to all the monitored items in data processing system 300. Service processor 335 also takes action based on the type of errors and defined thresholds. For example, service processor 335 may take note of excessive recoverable errors on a processor's cache memory and decide that this is predictive of a hard failure. Based on this determination, service processor 335 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
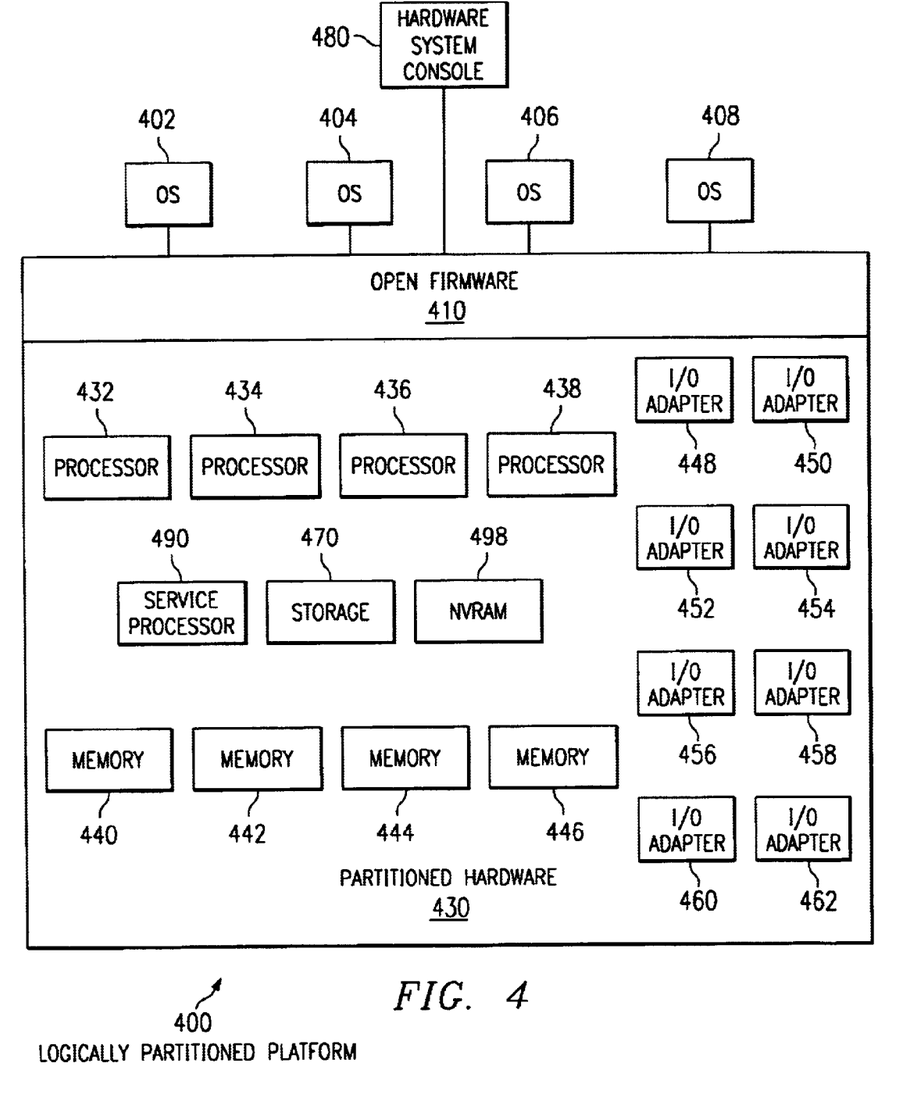
FIG. 4 depicts a block diagram of an exemplary logically partitioned platform in which the present invention may be implemented.

With reference now to FIG. 4, a block diagram of an exemplary logically partitioned platform is depicted in which the present invention may be implemented. The hardware in logically partitioned platform 400 may be implemented as, for example, server 300 in FIG. 3. Logically partitioned platform 400 includes partitioned hardware 430, Open Firmware 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of input/output (I/O) adapters 448–462, and a storage unit 470. Each of the processors 442–448, memory units 440–446, NV-RAM storage 498, and I/O adapters 448–462 may be assigned to one of multiple partitions within logically partitioned platform 400, each of which corresponds to one of operating systems 402–408.

Open Firmware 410 performs a number of functions and services for operating system images 402–408 to create and enforce the partitioning of logically partitioned platform 400. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Open Firmware 410 provides the OS images 402–408 running in multiple logical partitions each a virtual copy of a console and operator panel. The interface to the console is changed from an asynchronous teletype port device driver, as in the prior art, to a set of Open Firmware calls that emulate a port device driver. The Open Firmware 410 encapsulates the data from the various OS images onto a message stream that is transferred to a computer 480, known as a hardware system console.

Open Firmware 410 includes system boot firmware. A mechanism built into each of processors 432–438 as an architected instruction allows system firmware 410 to execute at any time. Thus, system checkpoints may be immediately displayed to the operator panel window on hardware system console 480 and also immediately logged to non-volatile random access memory (NV-RAM) even before the I/O path to these devices has been configured to accept any programmed input/output (PIO) accesses.

A checkpoint is a copy of the computer's memory that is periodically saved on disk along with the current register settings (last instruction executed, etc.). In the event of any failure, the last checkpoint serves as a recovery point. When the problem has been fixed, a restart program may copy the last checkpoint into memory, reset all the hardware registers and start the computer from that point. Any transactions in memory after the last checkpoint was taken until the failure occurred will be lost.

Hardware system console 480 is connected directly to logically partitioned platform 400 as illustrated in FIG. 4, or may be connected to logically partitioned platform through a network, such as, for example, network 102 in FIG. 1. Hardware system console 480 may be, for example, a desktop or laptop computer, and may be implemented as data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the Open Firmware 410 emulated port device driver associated with the then active window on the hardware system console 480.

Figure 5:
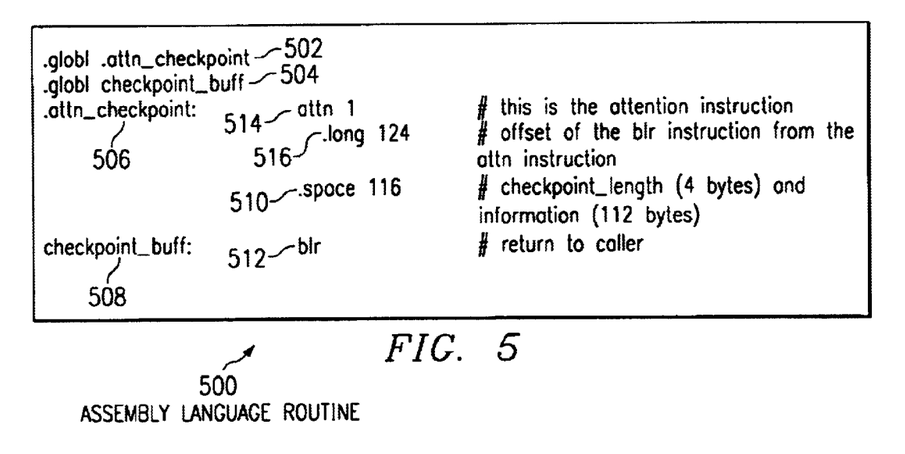
FIG. 5 depicts an exemplary assembly language routine executed within a host processor for instructing a service processor to display and log system checkpoints in accordance with the present invention.

With reference now to FIG. 5, an exemplary assembly language routine executed within a host processor for instructing a service processor to display and log system checkpoints is depicted in accordance with the present invention. With item 502, the assembly language routine 500 declares the assembly language routine attn_checkpoint to be callable from C-language code. Item 504 declares the checkpoint_buff structure variable to be accessible from C-language code. Item 506 defines the name of the assembly language routine. Item 514 is the attention instruction with I-field=1 to be assembled into machine code at the memory location of the entry point of the attn_checkpoint( ) routine. Item 508 defines the structure variable checkpoint_buff. Item 510 allocates memory space to be used by the checkpoint_buff structure. Item 512 is the return from subroutine instruction of the PowerPC architecture. Item 516 is a 32-bit constant, whose value is 124, to be assembled at the memory location right after the attn instruction. Since the checkpoint_buff is 116 bytes in size, the size of a PowerPC instruction is 4 bytes, and the constant is also 4 bytes, 116+4+4=124 is the offset of the "blr" instruction from the "attn" instruction in memory.

Figure 6:
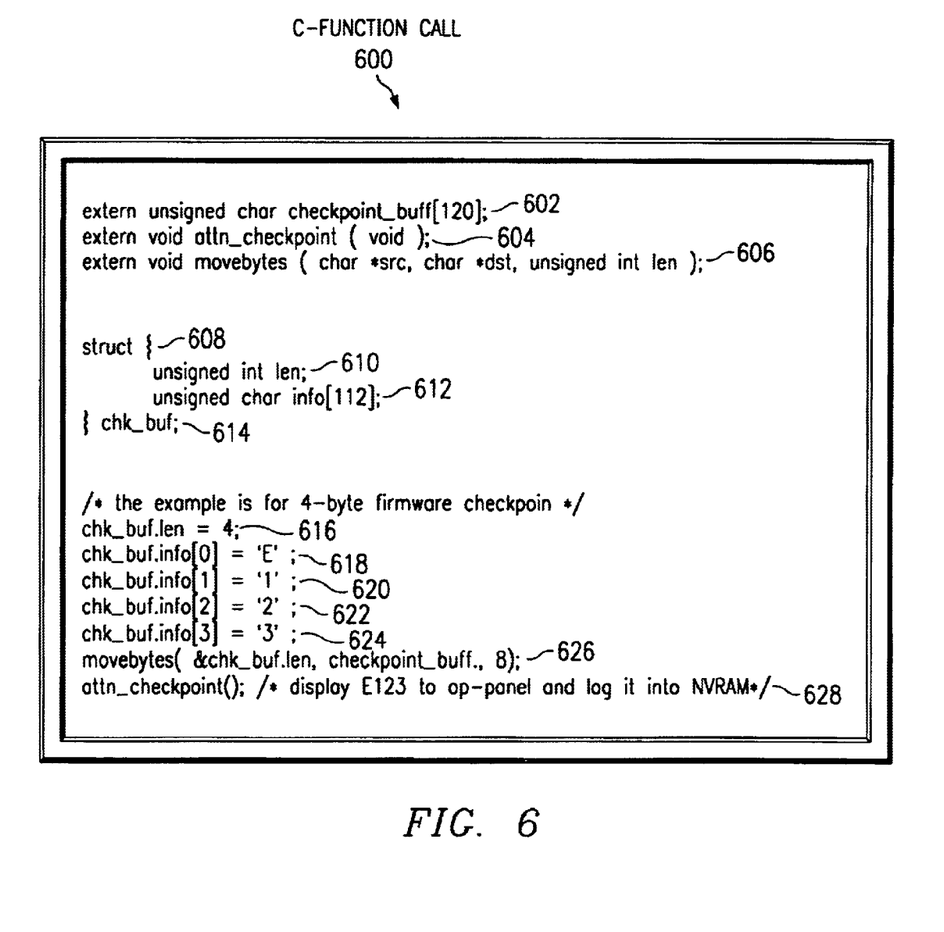
FIG. 6 depicts an exemplary C-function routine for calling the assembly language routine 500 in FIG. 5 for displaying and logging system checkpoints in accordance with the present invention.

With reference now to FIG. 6, an exemplary C-function calling the assembly language routine 500 in FIG. 5 for displaying and logging system checkpoints is depicted in accordance with the present invention. Line 602 declares that the checkpoint_buff [ ] is an externally defined array of characters. Line 604 declares the function prototype of attn_checkpoint ( ) which is an externally defined function. Line 608 declares the function prototype of movebytes ( ) which is an externally defined function. Line 608–614 define the chk_buf structure having two fields; an unsigned 32-bit "len" field, and an array of 112 characters "info" field. Line 616 sets the "len" field of the chk_buf structure to 4. Lines 618–624 set the first four characters of the "info" array field to character 'E', '1', '2', and '3', in respect to their order. Line 626 copies the content of the chgk_buf structure into the checkpoint_buff array starting from their beginning addresses, stopping after 8 bytes have been copied. Line 628 calls the attn_checkpoint function. E123 serves as a progress indicator in this example. It may mean that the I/O initialization has been executed up to the point that it begins to set up the third PCI—PCI bridge (EADS) of the second PCI-Host bridge of the first I/O bridge.

Figure 7:
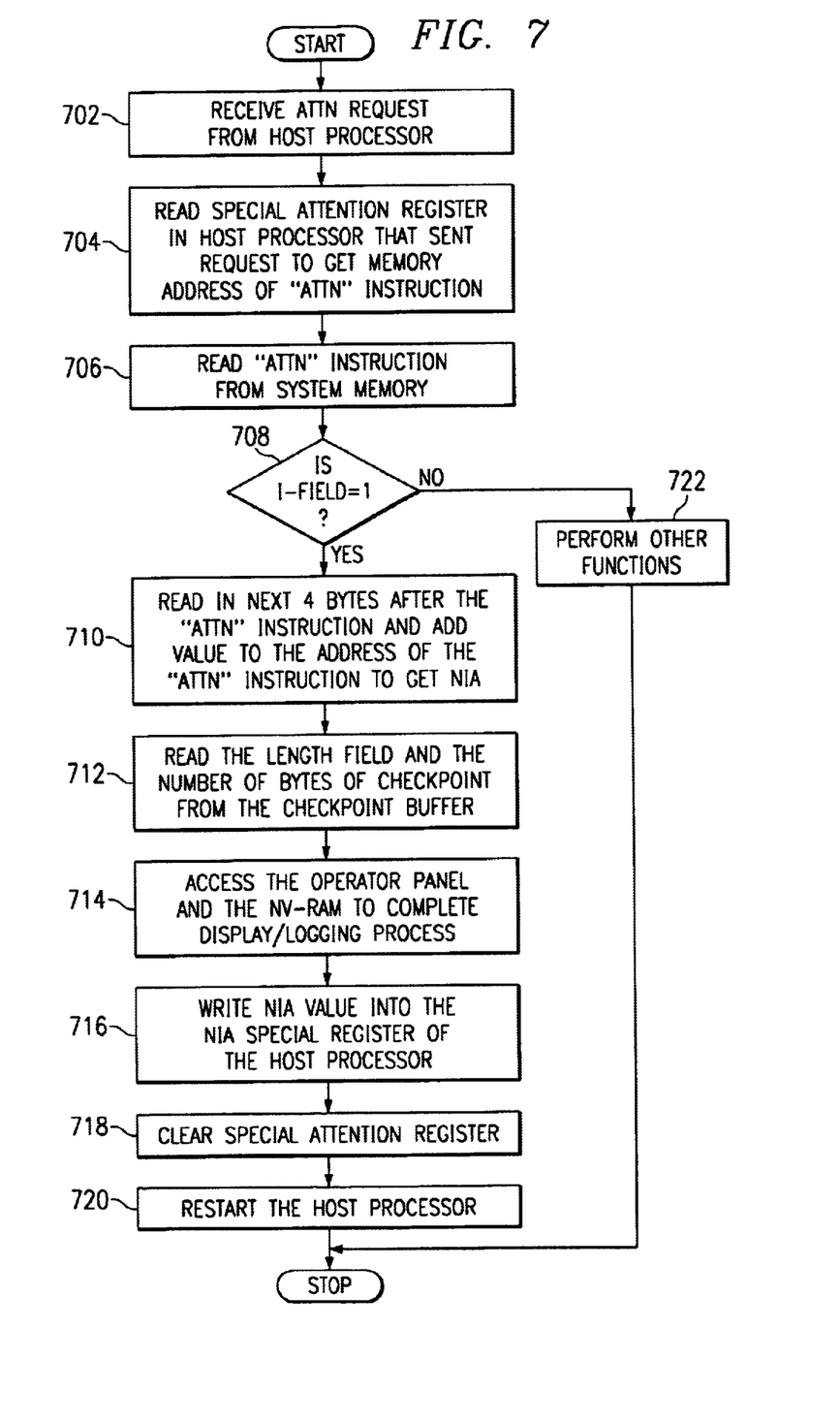
FIG. 7 depicts a flowchart illustrating an exemplary process for displaying and logging system checkpoints to an operator panel and NV-RAM prior to PIO accesses being enabled in accordance with the present invention.

With reference now to FIG. 7, a flowchart illustrating an exemplary process in a service processor, such as, for example service processor 490 in FIG. 4, for displaying and logging system checkpoints to an operator panel and NV-RAM prior to PIO accesses being enabled is depicted in accordance with the present invention. When the attention checkpoint routine, such as, for example, attention checkpoint routine 506 in FIG. 5, is called, such as by C-function call 600 in FIG. 6, a host processor, such as, for example, one of processors 432–438 in FIG. 4, executes the "attn" instruction 514. The host processor generates the output SP-ATTN signal. This signal interrupts the service processor. The "attn" instruction 514 has an architected I-field so that different ATTN requests can be sent to the service processor. As an example, if the I-field is zero, this indicates a hardware breakpoint ATTN to the service processor. In one embodiment of the present invention, in order to instruct the service processor to log and display checkpoints to the operator panel and NV-RAM, the I-field is set to one.

Upon the completion of the execution of the "attn" instruction, the host processor which has executed the "attn" instruction will have stopped itself, and asserts the SP-ATTN signal to the service processor. In an SMP environment, the service processor will stop other host processors through JTAG commands. If all ATTN signals of the host processors are tied together, the service processor will not know which host processor executed "attn" instruction and asserted ATTN signal, it may send JTAG commands to stop all host processors including the one already stopped by itself. In this case, the service processor has to identified the attention-asserted host processor by confirming the special attention register of the host processor has the memory address of the "attn" instruction.

Thus, the service processor receives the ATTN request from the host processor in the form of the SP-ATTN signal (step 702). When the service processor's ATTN interrupt handler starts serving the ATTN request, it reads a special attention register from the host processor that sent the ATTN request to get the memory address of the "attn" instruction (step 704). Next, the service processor reads the "attn" instruction from the system memory location previously identified (step 706). The service processor then determine whether the I-field is equal to one (step 708). If the I-field is not equal to one, then the service processor performs other functions not related to displaying and logging checkpoints to the operator panel and the NV-RAM (step 722).

If the I-field is equal to one, then the service processor reads in the 32-bit constant value after the "attn" instruction and adds the constant value to the address of the "attn" instruction to get the computed Next Instruction Address (NIA) (step 710). NIA is the address of the next instruction to be executed by the host processor. It is equivalent to the term "Program Counter". In this embodiment, the constant is chosen to be always a 32-bit quantity and needs four bytes to store its value. Another reason to choose a 32-bit constant is so that it occupies one PowerPC instruction storage unit which is four bytes long. The service processor then reads the length field and the number of bytes of the checkpoint from the checkpoint buffer (step 712).

Once the length field and number of bytes of the checkpoint have been read, the service processor accesses the operator panel, such as that provided by hardware operator panel 390 in FIG. 3, to display the checkpoint information to a user and accesses the NV-RAM 392 to log the checkpoint information (step 714). Next, the service processor writes the NIA value into the NIA special register of the host processor (step 716). Then the service processor clears the special attention register of the host processor (step 718), and restarts the host processor (step 720).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of recording information generated by a data processing system prior to completion enablement of programmed input/output services for the data processing system, the method comprising:

receiving, at a service processor, an attention interrupt from a host processor;

reading the information from a buffer within a system memory of the host processor; and presenting the information as output.

2. The method as recited in claim 1, wherein the step of presenting the information as output comprises writing the information to a non-volatile random access memory.

3. The method as recited in claim 1, wherein the step of presenting the information as output comprises displaying the information to a user via a video display.

4. The method as recited in claim 3, wherein the video display comprises an operator panel.

5. The method as recited in claim 1, wherein the information is a system checkpoint.

6. The method as recited in claim 1, further comprising:

after the attention interrupt has been sent, stopping the host processor.

7. The method as recited in claim 6, the step of stopping the host processor is performed by the host processor.

8. The method as recited in claim 1, further comprising:

after receipt of the attention interrupt, stopping the host processor and stopping a plurality of second host processors.

9. The method as recited in claim 8, further comprising:

after presenting the information as output, restarting the host processor and the plurality of second host processors.

10. A method of recording system checkpoints, the method comprising:

during a boot process for a data processing system, receiving, at a service processor, an attention interrupt from a host processor;

reading a special attention register within the host processor to determine a memory address within a system memory for an attention instruction;

reading the attention instruction from the system memory;

responsive to a determination that the attention instruction indicates an checkpoint, determining the address checkpoint within memory;

reading the checkpoint from the memory; and presenting the checkpoint as output.

11. The method as recited in claim 10, wherein the step of presenting the checkpoint as output comprises writing the checkpoint into a non-volatile random access memory.

12. The method as recited in claim 10, wherein the step of presenting the checkpoint as output comprises displaying the checkpoint on a video display.

13. The method as recited in claim 12, wherein the video display comprises an operator panel.

14. A computer program product in a computer readable media for use in a data processing system for recording information generated by the data processing system prior to completion enablement of programmed input/output services for the data processing system, the computer program product comprising:

first instructions for receiving, at a service processor, an attention interrupt from a host processor;

second instructions for reading the information from a buffer within a system memory of the host processor; and third instructions for presenting the information as output.

15. The computer program product as recited in claim 14, wherein the third instructions comprise writing the information to a non-volatile random access memory.

16. The computer program product as recited in claim 14, wherein the third instructions comprise displaying the information to a user via a video display.

17. The computer program product as recited in claim 16, wherein the video display comprises an operator panel.

18. The computer program product as recited in claim 14, wherein the information is a system checkpoint.

19. The computer program product as recited in claim 14, further comprising:

fourth instructions for stopping the host processor after the attention interrupt has been sent.

20. The computer program product as recited in claim 19, the fourth instructions are performed by the host processor.

21. The computer program product as recited in claim 14, further comprising:

fourth instructions for stopping the host processor and stopping a plurality of second host processors after receipt of the attention interrupt.

22. The computer program product as recited in claim 21, further comprising:

fifth instructions for restarting the host processor and the plurality of second host processors after presenting the information as output.

23. A computer program product of recording system checkpoints, the computer program product comprising:

first instructions for receiving, at a service processor, during a boot process for a data processing system, an attention interrupt from a host processor;

second instructions for reading a special attention register within the host processor to determine a memory address within a system memory for an attention instruction;

third instructions for reading the attention instruction from the system memory;

fourth instructions, responsive to a determination that the attention instruction indicates an checkpoint, for determining the address checkpoint within memory;

fifth instructions for reading the checkpoint from the memory; and sixth instructions for presenting the checkpoint as output.

24. The computer program product as recited in claim 23, wherein the sixth instructions comprises writing the checkpoint into a non-volatile random access memory.

25. The computer program product as recited in claim 23, wherein the sixth instructions comprise displaying the checkpoint on a video display.

26. The computer program product as recited in claim 25, wherein the video display comprises an operator panel.

27. A system for recording information generated by a data processing system prior to completion enablement of programmed input/output services for the data processing system, the system comprising:

first means for receiving, at a service processor, an attention interrupt from a host processor;

second means for reading the information from a buffer within a system memory of the host processor; and third means for presenting the information as output.

28. The system as recited in claim 27, wherein the third means comprise writing the information to a non-volatile random access memory.

29. The system as recited in claim 27, wherein the third means comprise displaying the information to a user via a video display.

30. The system as recited in claim 29, wherein the video display comprises an operator panel.

31. The system as recited in claim 27, wherein the information is a system checkpoint.

32. The system as recited in claim 27, further comprising:

fourth means for stopping the host processor after the attention interrupt has been sent.

33. The system as recited in claim 32, the fourth means are performed by the host processor.

34. The system as recited in claim 27, further comprising:

fourth means for stopping the host processor and stopping a plurality of second host processors after receipt of the attention interrupt.

35. The system as recited in claim 34, further comprising:

fifth means for restarting the host processor and the plurality of second host processors after presenting the information as output.

36. A system of recording system checkpoints, the system comprising:

first means for receiving, at a service processor, during a boot process for a data processing system, an attention interrupt from a host processor;

second means for reading a special attention register within the host processor to determine a memory address within a system memory for an attention instruction;

third means for reading the attention instruction from the system memory;

fourth means, responsive to a determination that the attention instruction indicates an checkpoint, for determining the address checkpoint within memory;

fifth means for reading the checkpoint from the memory; and sixth means for presenting the checkpoint as output.

37. The system as recited in claim 36, wherein the sixth means comprises writing the checkpoint into a non-volatile random access memory.

38. The system as recited in claim 36, wherein the sixth means comprise displaying the checkpoint on a video display.

39. The system as recited in claim 38, wherein the video display comprises an operator panel.

* * * * *